United States Patent Office 3,265,706
Patented August 9, 1966

3,265,706
PROCESSES FOR PREPARING CERTAIN 2-SUBSTITUTED BENZIMIDAZOLE COMPOUNDS
George Gal, Summit, and Meyer Sletzinger, North Plainfield, N.J., assignors to Merck & Co., Inc., Rahway, N.J., a corporation of New Jersey
No Drawing. Filed Aug. 19, 1965, Ser. No. 481,116
5 Claims. (Cl. 260—302)

This invention relates generally to a novel method for preparing useful chemical compounds. Still more specifically, it is concerned with the process for preparing 2-substituted benzimidazole-1-oxides. More particularly, it is concerned with the preparation of 2-substituted benzimidazole-1-oxides from 2-nitro-N-(substituted methyl)-anilines.

It is an object of the present invention to provide a novel process for preparing benzimidazole-1-oxides. It is a further object to provide a method for preparing 2-substituted benzimidazole-1-oxides from certain N-(substitutedmethyl)-anilines. Other objects will become apparent from the following description of the invention.

In accordance with this invention, it has now been found that compounds of the formula

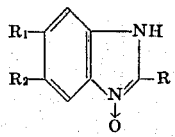

may be prepared from 2-nitro-N-(substitutedmethyl)-anilines where R is a five-membered heterocyclic radical containing nitrogen and sulfur such as thiazolyl, isothiazolyl or thiadiazolyl; and $R_1$ and $R_2$ are hydrogen, loweralkyl, halo, phenyl, halophenyl, thienyl, loweralkoxy, loweralkylthio, phenoxy or phenylithio, provided that when both $R_1$ and $R_2$ are other than halo, at least one of $R_1$ and $R_2$ is hydrogen.

The halo moieties on these benzimidazole-1-oxides may be chloro or fluoro and the like, whereas the loweralkyl groups include methyl, ethyl, isopropyl, and the like. As illustrative of the loweralkoxy and loweralkylthio groups designated $R_1$ and $R_2$, there may be mentioned methoxy, ethoxy, methylthio, propylthio, and the like.

It should be understood that when reference is made in the specification and claims to a term "benzimidazole-1-oxide" or a formula depicting the same, that such term or formula includes within its meaning and scope the tautomeric form thereof, namely the corresponding 1-hydroxy benzimidazole. These compounds have the formula

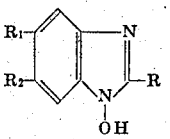

where R, $R_1$ and $R_2$ are as defined above.

The process of this invention may be generally represented as follows:

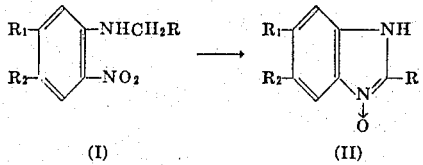

where R, $R_1$ and $R_2$ are as earlier defined.

In accordance with this invention, it has now been found that a 2-nitro-N-(substitutedmethyl)-aniline of Formula I above may be treated with a strong base in a suitable solvent to obtain the corresponding benzimidazole-1-oxide (Formula II). Bases found useful in this process are strong bases such as alkali metal hydroxides, for example lithium hydroxide, sodium hydroxide and potassium hydroxide, alkali metal lower alkoxides such as sodium methoxide, and quaternary bases such as benzyl trimethyl ammonium hydroxide, trimethyl allyl ammonium hydroxide, carboxymethyl triethyl ammonium hydroxide and tetraloweralkyl ammonium hydroxides such as tetramethyl ammonium hydroxide, tetraethyl ammonium hydroxide, tetrapropyl ammonium hydroxide, tetraisobutyl ammonium hydroxide, and the like. The process is run in a solvent capable of dissolving the base. Solvents such as water, lower-alkanols for example methanol, ethanol, propanol, isopropanol and the like, aqueous dioxane and polyols such as glycol are examples of some of the solvents which may be used.

It is preferred that at least about 1–5 moles of base per mole of the nitroaniline be used and a still greater ratio of base to the aniline is not detrimental to the reaction.

The reaction is preferably conducted at a temperature of about 50° to about 100° C. and it is more desirable that it be performed at about 60° to about 80° C. However, the reaction temperatures may extend beyond the aforementioned figures and are not critical to the success of the process.

The pH of the resulting solution is then lowered to about 5–6 in order to convert the salt of the benzimidazole-1-oxide which is obtained to the 1-oxide form. The product thereby precipitates, is collected by normal means such as by filtration, and is purified by washing and recrystallization. Acids useful for lowering the pH consist of any convenient acid, for example acetic acid, phosphoric acid, sulfuric acid, hydrochloric acid, and the like.

Compounds preparable according to the above-described process include 2-(4'-thiazolyl)-benzimidazole-1-oxide,
2-(2'-thiazolyl)-benzimidazole-1-oxide,
2-[4'-(1',2',5'-thiadiazolyl)]-benzimidazole-1-oxide,
2-(4'-isothiazolyl)-benzimidazole-1-oxide,
2-(4'-thiazolyl)-5-methoxy benzimidazole-1-oxide,
2-(4'-thiazolyl)-5-fluoro benzimidazole-1-oxide,
2-(4'-thiazolyl)-5-phenyl benzimidazole-1-oxide,
2-(2'-thiazolyl)-6-chloro benzimidazole-1-oxide.
2-(2'-thiazolyl)-5-(2'-thienyl)-benzimidazole-1-oxide,
2-[4'-(1,2,5-thiadiazolyl)-6-methyl benzimidazole-1-oxide,
2-(4'-thiazolyl)-5-(4'-fluorophenyl)-benzimidazole-1-oxide, and
2-(4'-thiazolyl)-5-phenoxy benzimidazole-1-oxide.

The benzimidazole-1-oxides prepared according to the process of this invention are active against helminthiasis, an infection involving infestation of an animal body by various species of parasitic worms.

The starting nitroanilines of this invention are prepared by treating chloronitrobenzene or an appropriately substituted chloronitrobenzene with a substituted methylamine of the formula R—$CH_2NH_2$, where R is as earlier defined, at about 100°–200° C., preferably in inert organic solvent.

The substituted methylamines may be prepared from the corresponding heterocyclic carboxylic acid by treatment with lithium aluminum hydride, thionyl chloride and base, and ammoniating the resulting chloromethyl compound with phthalimide or ammonia. The temperatures for the amination may vary from about room temperature to about 125° C. When ammonia is used as a reactant, it is preferred that it be kept in the reaction mixture. A base, such as sodium or potassium ethylate, or an alkali metal hydroxide such as sodium and potassium hydroxide is then added to the reaction mixture to liberate the substituted methylamine.

Some of the chloronitrobenzenes useful in preparing the starting materials of this invention are known compounds. Particular nitrochlorobenzenes not described in the literature are obtained by processes known to those skilled in the art. For instance, a desired nitrochlorobenzene reactant may be synthesized from a corresponding aniline or o-nitroaniline by diazotizing the amino group with a strong acid and sodium nitrite, treating the product with hydrochloric acid and water in the presence of a cuprous salt, and nitrating the resulting chlorobenzene to give the nitrochlorobenzene.

The following examples are given for the purpose of illustration and not by way of limitation.

*Example 1.—2-(4'-thiazolyl)-benzimidazole-1-oxide*

To a solution of 800 mg. sodium hydroxide in 16 ml. of methanol is added 945 mg. of 2-nitro-(4-thiazolylmethyl)-aniline. The solution is heated at reflux temperature for five hours. The solvent is removed in vacuo. The residue is then dissolved in 20 ml. of water and the pH is adjusted from 11.2 to 5.5 by addition of 2 N hydrochloric acid. The solid precipitate, 2-(4'-thiazolyl)-benzimidazole-1-oxide, is filtered, washed with water and recrystallized from ethanol; M.P. 238° C.

When the above process is carried out and potassium hydroxide or lithium hydroxide is used in place of sodium hydroxide, 2-(4'-thiazolyl)-benzimidazole-1-oxide is again obtained.

When
2-nitro-5-methyl-(4-thiazolylmethyl)-aniline,
2-nitro-5-methylthio-(4-thiazolylmethyl)-aniline,
2-nitro-5-phenyl-(4-thiazolylmethyl)-aniline,
2-nitro-4-ethyl-(4-thiazolylmethyl)-aniline,
2-nitro-5-phenoxy-(4-thiazolylmethyl)-aniline,
2-nitro-4-phenylthio-(4-thiazolylmethyl)-aniline,
2-nitro-5-(2'-thienyl)-(4-thiazolylmethyl)-aniline or
2-nitro-5-(4'-fluorophenyl)-(4-thiazolylmethyl)-aniline
is used in the above process in place of 2-nitro-(4-thiazolylmethyl)-aniline, there is obtained
2-(4'-thiazolyl)-5-methylbenzimidazole-1-oxide,
2-(4'-thiazolyl)-5-methylthio benzimidazole-1-oxide,
2-(4'-thiazolyl)-5-phenyl benzimidazole-1-oxide,
2-(4'-thiazolyl)-6-ethyl benzimidazole-1-oxide,
2-(4'-thiazolyl)-5-phenoxy benzimidazole-1-oxide,
2-(4'-thiazolyl)-6-phenylthio benzimidazole-1-oxide or
2-(4'-thiazolyl)-5-(2'-thienyl)-benzimidazole-1-oxide, or
2-(4'-thiazolyl)-5-(4'-fluorophenyl)-benzimidazole-1-oxide,
respectively.

*Example 2.—2-(2'-thiazolyl)-benzimidazole-1-oxide*

750 mg. of 2-nitro-(2-thiazolylmethyl)-aniline is added to a solution of 700 mg. of potassium hydroxide and 20 ml. of ethanol. The solution is refluxed for six hours and the solvent is then removed in vacuo. The residue is dissolved in 20 ml. of water and the pH is adjusted to 5.5 by addition of 2 N hydrochloric acid, thereby precipitating 2-(2'-thiazolyl)-benzimidazole-1-oxide.

When
2-nitro-4-(2'-chlorophenyl)-(4-thiazolyl-methyl)-aniline,
2-nitro-4-methoxy-(4-thiazolylmethyl)-aniline,
2-nitro-4-chloro-(4-thiazolylmethyl)-aniline,
2-nitro-5-fluoro-(4-thiazolylmethyl)-aniline,
2-nitro-[4-(1,2,5-thiadiazolylmethyl)]-aniline, or
2-nitro-(4-isothiazolylmethyl)-aniline
is used in the above process in place of
2-nitro-(2-thiazolylmethyl)-aniline, there is obtained
2-(4'-thiazolyl)-6-(2'-chlorophenyl)-benzimidazole-1-oxide,
2-(4'-thiazolyl)-6-methoxy benzimidazole-1-oxide,
2-(4'-thiazolyl)-6-chloro benzimidazole-1-oxide,
2-(4'-thiazolyl)-5-fluoro benzimidazole-1-oxide,
2-[4'-(1',2',5'-thiadiazolyl)]-benzimidazole-1-oxide, or
2-(4'-isothiazolyl)-benzimidazole-1-oxide,
respectively.

*Example 3.—2-nitro-(4-thiazolylmethyl)-aniline*

7.9 grams of 2-nitrochlorobenzene (0.05 mole) is mixed with 11.4 grams of 4-aminomethylthiazole (0.1 mole). The clear solution is heated for about 30 minutes to 100° C. and is maintained at that temperature for about 5 hours with agitation. The resulting dark oil is mixed with 20 ml. water. The oil is separated, extracted three times wtih 10 ml. benzene, and the combined benzene extract is re-extracted with 120 ml. of 2.5 N hydrochloric acid. The resulting extract is then treated with 10 ml. of concentrated hydrochloric acid. The precipitate which forms, 2-nitro-(4-thiazolylmethyl)-aniline hydrochloride, is filtered, washed with benzene and then with water, and then stirred with 50 ml. of saturated sodium bicarbonate solution. The 2-nitro-(4-thiazolylmethyl)-aniline product is then filtered, washed with water, and dried in vacuo; M.P. 82–83° C.

When the above process is carried out and 2-nitrochlorobenzene is replaced by an appropriately substituted 2-nitrochlorobenzene or an appropriately substituted methylamine is used in place of 4-aminomethylthiazole, any desired substituted nitroaniline starting material of this invention may be prepared.

Example 3 is included for the purpose of describing a process generally applicable in preparing the nitroaniline starting materials of this invention. These nitroanilines and the processes for their preparation are not part of the present invention but are the invention of our colleague, Janos Kollonitsch, and claimed in United States patent application Serial No. 462,419 filed by him on June 8, 1965.

It should be understood that although this invention has been described with reference to particular embodiments thereof, changes and modifications may be made which are within its intended scope and it should be limited only by the language of the appended claims.

What is claimed is:

1. A process for preparing compounds of the formula

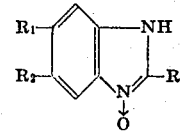

where R is thiazolyl, isothiazolyl or thiadiazolyl; and $R_1$ and $R_2$ are each hydrogen, loweralkyl, halo, phenyl, halophenyl, thienyl, loweralkoxy, loweralkylthio, phenoxy or phenylthio, provided that when both $R_1$ and $R_2$ are other than halo, at least one of $R_1$ and $R_2$ is hydrogen, which comprises treating a compound of the formula

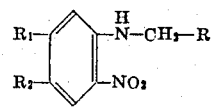

where R, $R_1$ and $R_2$ are as defined above, with a strong base in a solvent capable of dissolving the base.

2. A process for preparing compounds of the formula

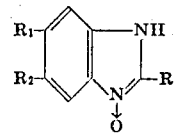

where R is thiazolyl, isothiazolyl or thiadiazolyl; and $R_1$ and $R_2$ are each hydrogen, loweralkyl, halo, phenyl, halophenyl, thienyl, loweralkoxy, loweralkylthio, phenoxy or phenylthio, provided that when both $R_1$ and $R_2$ are other than halo, at least one of $R_1$ and $R_2$ is hydrogen, which comprises treating a compound of the formula

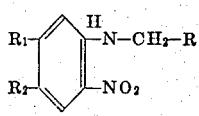

where R, $R_1$ and $R_2$ are as defined above, with an alkali metal hydroxide in a solvent capable of dissolving the base.

3. A process for preparing compounds of the formula

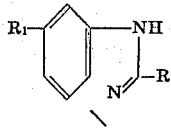

where R is thiazolyl, isothiazolyl or thiadiazolyl; and $R_1$ is hydrogen, fluoro, phenyl or 4'-fluorophenyl, which comprises treating a compound of the formula

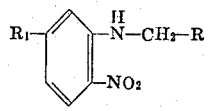

where R and $R_1$ are as defined above, with an alkali metal hydroxide in a solvent capable of dissolving the base.

4. A process for preparing 2-(4'-thiazolyl)-benzimidazole-1-oxide which comprises treating 2-nitro-(4-thiazolylmethyl)-aniline with an alkali metal hydroxide in a solvent capable of dissolving the base.

5. A process for preparing 2-(2'-thiazolyl)-benzimidazole-1-oxide which comprises treating 2-nitro-(2-thiazolylmethyl)-aniline with an alkali metal hydroxide in a solvent capable of dissolving the base.

No references cited.

HENRY R. JILES, *Acting Primary Examiner*.

ALTON D. ROLLINS, *Assistant Examiner*.

UNITED STATES PATENT OFFICE
CERTIFICATE OF CORRECTION

Patent No. 3,265,706                                          August 9, 1966

George Gal et al.

It is hereby certified that error appears in the above numbered patent requiring correction and that the said Letters Patent should read as corrected below.

Column 5, lines 15 to 20, the formula should appear as shown below instead of as in the patent:

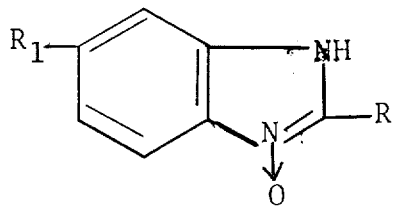

Signed and sealed this 1st day of August 1967.

(SEAL)
Attest:

EDWARD M. FLETCHER, JR.                          EDWARD J. BRENNER
Attesting Officer                                      Commissioner of Patents